(12) United States Patent
Zhang et al.

(10) Patent No.: US 12,082,030 B2
(45) Date of Patent: Sep. 3, 2024

(54) UPLINK GAP CONFIGURATION

(71) Applicant: QUALCOMM Incorporated, San Diego, CA (US)

(72) Inventors: Qian Zhang, Basking Ridge, NJ (US); Tao Luo, San Diego, CA (US); Yan Zhou, San Diego, CA (US); Navid Abedini, Basking Ridge, NJ (US); Peter Gaal, San Diego, CA (US); Juan Montojo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 17/448,631

(22) Filed: Sep. 23, 2021

(65) Prior Publication Data
US 2023/0086445 A1    Mar. 23, 2023

(51) Int. Cl.
*H04W 24/10* (2009.01)
*H04L 5/00* (2006.01)
*H04L 5/14* (2006.01)
*H04W 52/34* (2009.01)
*H04W 76/28* (2018.01)

(52) U.S. Cl.
CPC ........... *H04W 24/10* (2013.01); *H04L 5/0048* (2013.01); *H04L 5/14* (2013.01); *H04W 52/34* (2013.01); *H04W 76/28* (2018.02)

(58) Field of Classification Search
CPC ..... H04W 24/10; H04W 52/34; H04W 76/28; H04W 52/367; H04L 5/0048; H04L 5/14; H04L 5/1423; H04B 17/14; H04B 17/345
See application file for complete search history.

(56) References Cited

U.S. PATENT DOCUMENTS

2021/0135770 A1* 5/2021 Schober ................. H04L 5/003
2023/0100583 A1* 3/2023 Niu .................... H04W 36/0088
                                                                370/329

FOREIGN PATENT DOCUMENTS

WO    WO-2022152842 A1 *   7/2022

* cited by examiner

*Primary Examiner* — Steven Hieu D Nguyen
(74) *Attorney, Agent, or Firm* — Harrity & Harrity, LLP

(57) ABSTRACT

Various aspects of the present disclosure generally relate to wireless communication. In some aspects, a user equipment (UE) may receive configuration information indicating an uplink gap. The UE may transmit a reference signal in the uplink gap. The UE may perform at least one of a self-interference measurement or a beam pair calibration for full-duplex communication based at least in part on the reference signal. Numerous other aspects are described.

26 Claims, 8 Drawing Sheets

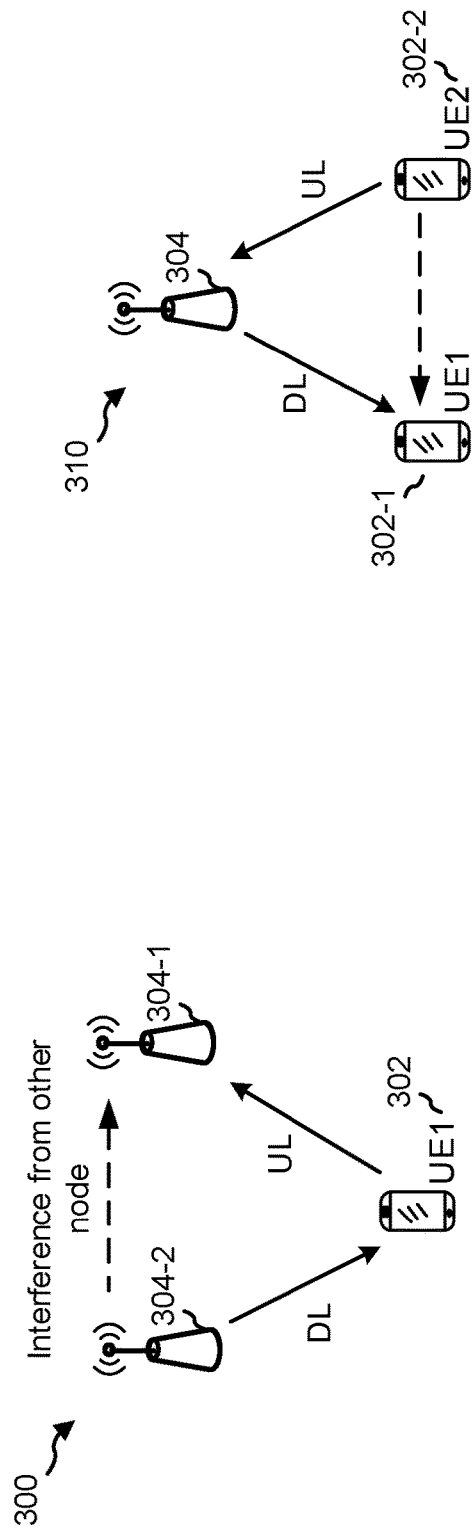
FIG. 3B
FIG. 3A
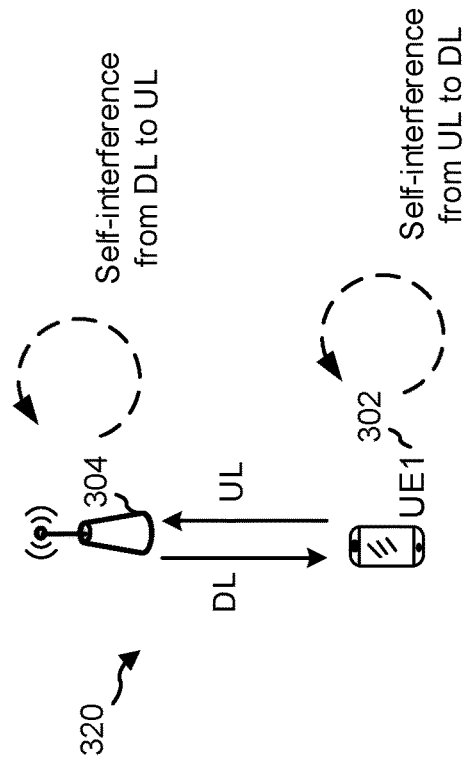
FIG. 3C

UPLINK GAP CONFIGURATION

FIELD OF THE DISCLOSURE

Aspects of the present disclosure generally relate to wireless communication and to techniques and apparatuses for uplink gap configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving configuration information indicating an uplink gap. The method may include transmitting a reference signal in the uplink gap. The method may include performing at least one of a self-interference measurement or a beam pair calibration for full-duplex communication based at least in part on the reference signal.

Some aspects described herein relate to a method of wireless communication performed by a base station. The method may include transmitting, to a UE, configuration information indicating an uplink gap. The method may include performing full-duplex communication with the UE based at least in part on the configuration information.

Some aspects described herein relate to a UE for wireless communication. The UE may include a memory and one or more processors coupled to the memory. The one or more processors may be configured to receive configuration information indicating an uplink gap. The one or more processors may be configured to transmit a reference signal in the uplink gap. The one or more processors may be configured to perform at least one of a self-interference measurement or a beam pair calibration for full-duplex communication based at least in part on the reference signal.

Some aspects described herein relate to a base station for wireless communication. The base station may include a memory and one or more processors coupled to the memory. The one or more processors may be configured to transmit, to a UE, configuration information indicating an uplink gap. The one or more processors may be configured to perform full-duplex communication with the UE based at least in part on the configuration information.

Some aspects described herein relate to a non-transitory computer-readable medium that stores a set of instructions for wireless communication by a UE. The set of instructions, when executed by one or more processors of the UE, may cause the UE to receive configuration information indicating an uplink gap. The set of instructions, when executed by one or more processors of the UE, may cause the UE to transmit a reference signal in the uplink gap. The set of instructions, when executed by one or more processors of the UE, may cause the UE to perform at least one of a self-interference measurement or a beam pair calibration for full-duplex communication based at least in part on the reference signal.

Some aspects described herein relate to a non-transitory computer-readable medium that stores a set of instructions for wireless communication by a base station. The set of instructions, when executed by one or more processors of the base station, may cause the base station to transmit, to a UE, configuration information indicating an uplink gap. The set of instructions, when executed by one or more processors of the base station, may cause the base station to perform full-duplex communication with the UE based at least in part on the configuration information.

Some aspects described herein relate to an apparatus for wireless communication. The apparatus may include means for receiving configuration information indicating an uplink gap. The apparatus may include means for transmitting a reference signal in the uplink gap. The apparatus may include means for performing at least one of a self-interference measurement or a beam pair calibration for full-duplex communication based at least in part on the reference signal.

Some aspects described herein relate to an apparatus for wireless communication. The apparatus may include means for transmitting, to a UE, configuration information indicating an uplink gap. The apparatus may include means for performing full-duplex communication with the UE based at least in part on the configuration information.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A-3C are diagrams illustrating examples of full duplex (FD) communication in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
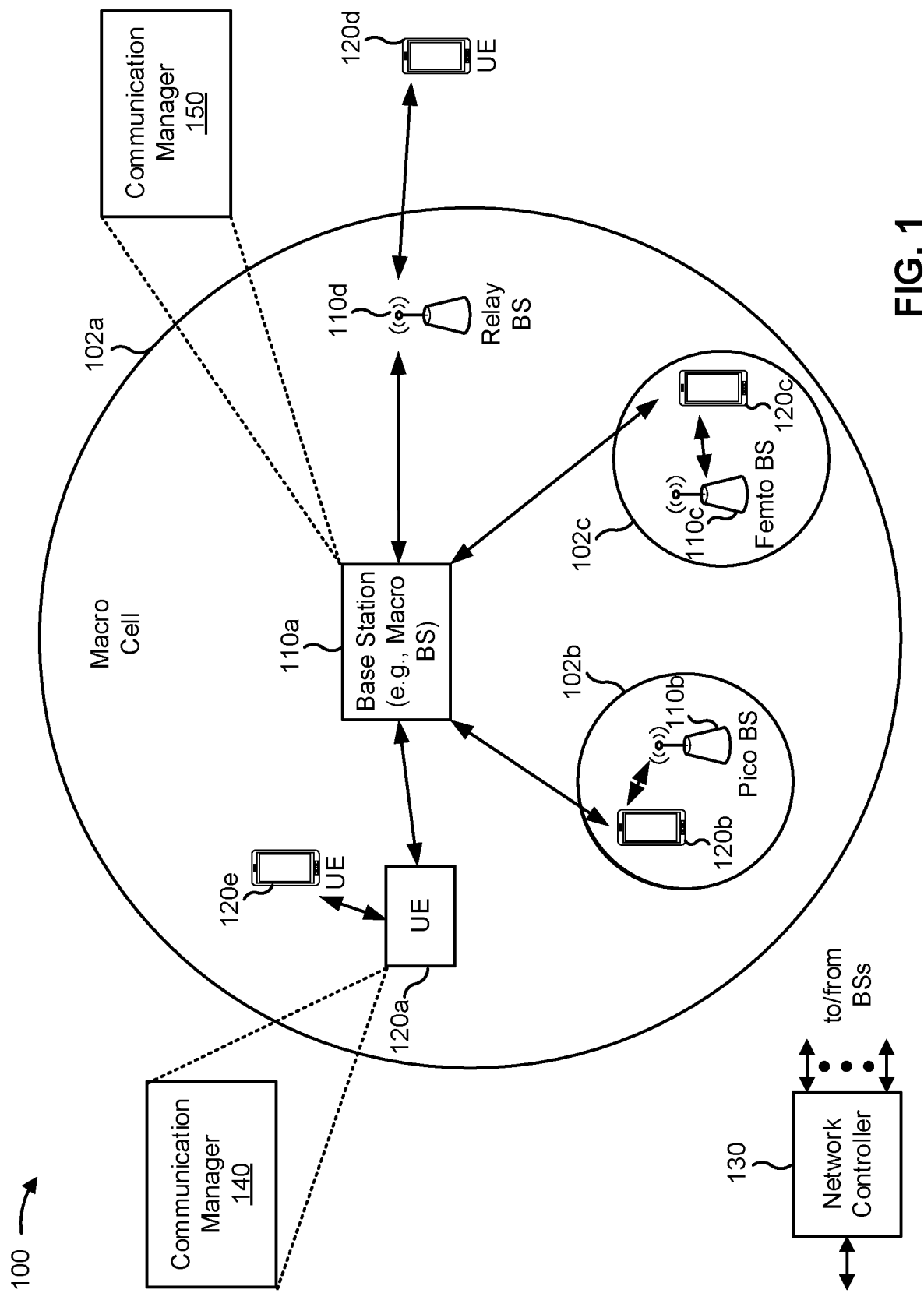
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive configuration information indicating an uplink gap; transmit a reference signal in the uplink gap; and perform at least one of a self-interference measurement or a beam pair calibration for full-duplex communication based at least in part on the reference signal. Additionally, or alternatively, the communication manager 140 may perform one or more other operations described herein.

In some aspects, the base station 110 may include a communication manager 150. As described in more detail elsewhere herein, the communication manager 150 may transmit, to a UE, configuration information indicating an uplink gap; and perform full-duplex communication with the UE based at least in part on the configuration information. Additionally, or alternatively, the communication manager 150 may perform one or more other operations described herein.

As indicated above, FIG. 1 is provided as an example. Other examples may differ from what is described with regard to FIG. 1.

Figure 2:
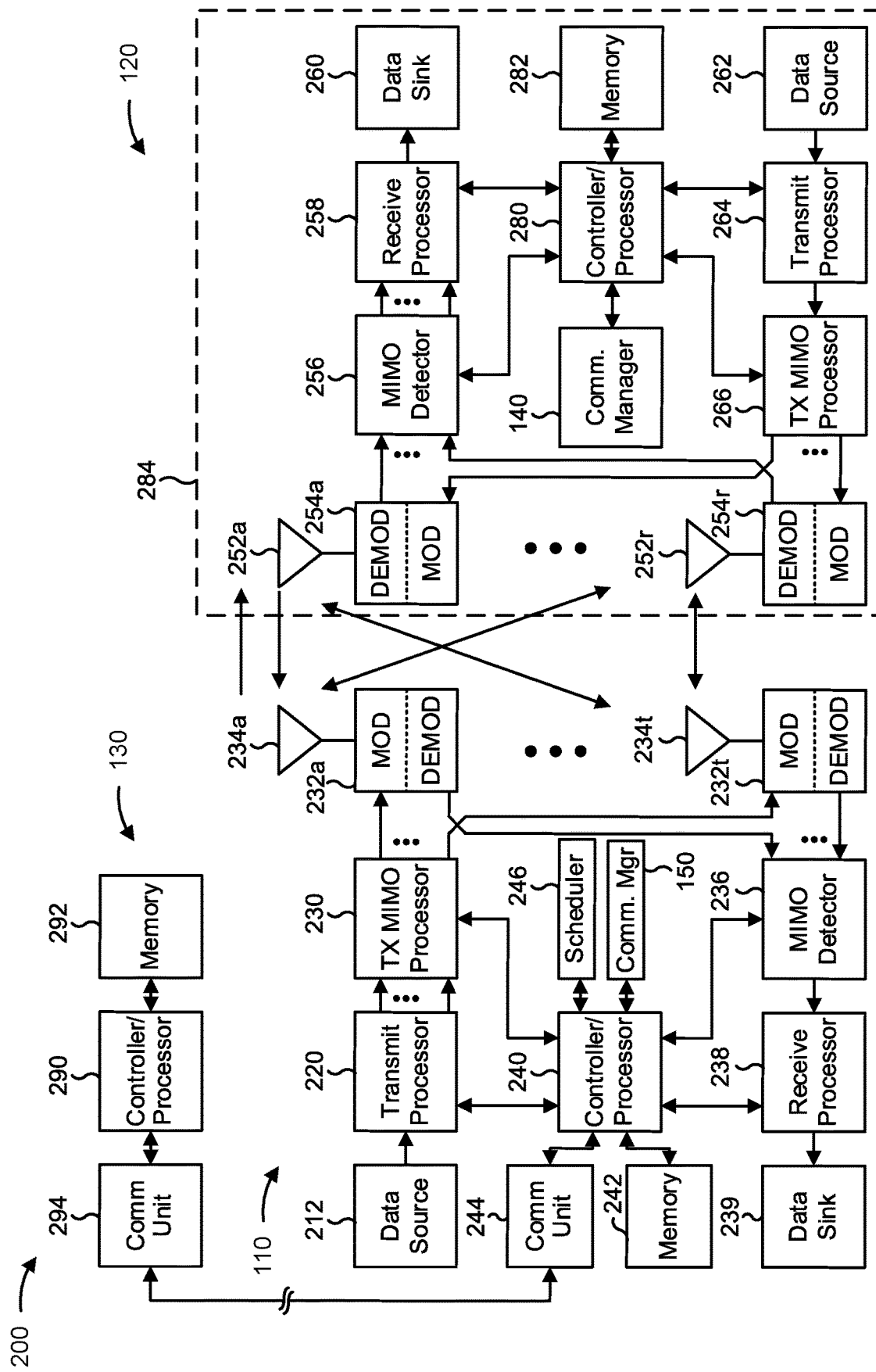
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-8).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-8).

The controller/processor 240 of the base station 110, the controller/processor 280 of the UE 120, and/or any other component(s) of FIG. 2 may perform one or more techniques associated with an uplink gap for beam calibration, as described in more detail elsewhere herein. For example, the controller/processor 240 of the base station 110, the controller/processor 280 of the UE 120, and/or any other component(s) of FIG. 2 may perform or direct operations of, for example, process 500 of FIG. 5, process 600 of FIG. 6, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some examples, executing instructions may include running the instructions, converting the instructions, compiling the instructions, and/or interpreting the instructions, among other examples.

In some aspects, the UE 120 includes means for receiving configuration information indicating an uplink gap; means for transmitting a reference signal in the uplink gap; and/or means for performing at least one of a self-interference measurement or a beam pair calibration for full-duplex communication based at least in part on the reference signal. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, configuration information indicating an uplink gap; and/or means for performing full-duplex communication with the UE based at least in part on the configuration information. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3C are diagrams illustrating examples 300, 310, 320 of full duplex (FD) communication in accordance with the present disclosure. An FD communication is a communication that utilizes overlapped time resources at a single node (such as a UE or a base station) for transmission and reception. For example, a UE or a base station may perform a transmission and a reception using the same time resources, such as via frequency division multiplexing (FDM) or spatial division multiplexing (SDM). "FDM" refers to performing two or more communications using different frequency resource allocations. "SDM" refers to performing two or more communications using different spatial parameters, such as different transmission configuration indicator (TCI) states corresponding to beams. An SDM communication can use overlapped time resources and frequency resources, and an FDM communication can use overlapped time resources and spatial resources (that is, overlapped beam parameters, TCI states, or the like). A TCI state indicates a spatial parameter for a communication. For example, a TCI state for a communication may identify a source signal (such as a synchronization signal block, a channel state information reference signal, or the like) and a spatial parameter to be derived from the source signal for the purpose of transmitting or receiving the communication. For example, the TCI state may indicate a quasi-colocation (QCL) type. A QCL type may indicate one or more spatial parameters to be derived from the source signal. The source signal may be referred to as a QCL source. FD communications can include dynamic traffic (such as scheduled by downlink control information (DCI)) and/or semi-static traffic. Semi-static traffic is traffic associated with a semi-persistent resource, such as a semi-persistent scheduling (SPS) configured resource or a configured grant (CG), as described in more detail in connection with FIG. 4.

The example 300 of FIG. 3A includes a UE1 302 and two base stations (e.g., TRPs) 304-1, 304-2, wherein the UE1 302 is sending UL transmissions to base station 304-1 and is receiving DL transmissions from base station 304-2. In the example 300 of FIG. 3A, FD is enabled for the UE1 302, but not for the base stations 304-1, 304-2. Thus, the base stations 304-1 and 304-2 are half duplex (HD) base stations. The example 310 of FIG. 3B includes two UEs, UE1 302-1 and UE2 302-2, and a base station 304, wherein the UE1 302-1 is receiving a DL transmission from the base station 304 and the UE2 302-2 is transmitting a UL transmission to the base station 304. In the example 310 of FIG. 3B, FD is enabled for the base station 304, but not for the UEs UE1 302-1 and UE2 302-2. Thus, the UEs UE1 302-1 and UE2 302-2 are half duplex UEs. The example 320 of FIG. 3C includes a UE1 302 and a base station 304, wherein the UE1 302 is receiving a DL transmission from the base station 304 and the UE1 302 is transmitting a UL transmission to the base station 304. In the example 320 of FIG. 3C, FD is enabled for both the UE1 302 and the base station 304. In the example 320 of FIG. 3C, the UE1 302 and the base station 304 communicate using a beam pair. A beam pair may include a downlink beam and an uplink beam. For example, a UE1 302 may use a beam pair that includes a downlink beam (that is, a receive beam) at the UE1 302 and an uplink beam (that is, a transmit beam) at the UE1 302 to communicate with the base station 304. The base station 304 may use a downlink beam (that is, a transmit beam) at the base station 304 to transmit communications received via the UE1 302's downlink beam, and may use an uplink beam (that is, a receive beam) at the base station 304 to receive communications transmitted via the UE1 302's uplink beam.

In FIGS. 3A-3C, interference is indicated by dashed lines. Interference can occur between nodes of examples 300, 310, 320 (referred to as "cross-link interference"). Examples of cross-link interference are shown in FIGS. 3A and 3B. In FIG. 3A, BS 304-2's downlink transmission interferes with BS 304-1's uplink transmission. In FIG. 3B, UE1 302-1's uplink transmission interferes with UE2 302-2's downlink transmission. In some cases, self-interference can occur. Self-interference occurs when a node's transmission interferes with a reception operation of the node. For example, self-interference may occur due to reception by a receive antenna of radiated energy from a transmit antenna, cross-talk between components, or the like. Examples of self-interference at a UE 302 (from an uplink transmission to a downlink reception) and at a BS 304 (from a downlink transmission to an uplink reception) are shown in FIG. 3C. It should be noted that the above-described cross-link interference and self-interference conditions can occur in HD deployments and in FD deployments.

As indicated above, FIGS. 3A-3C are provided as one or more examples. Other examples may differ from what is described with regard to FIGS. 3A-3C.

A UE and a base station may communicate with each other in an FD mode, in which either or both of the UE and the base station are performing FD communication. In an FD mode, a UE or a base station may use a beam pair (as described above) to communicate. Furthermore, an FD mode may be associated with some degree of self-interference, as also described above. For example, such self-interference may be caused by a transmission that uses the beam pair interfering with a reception that uses the beam pair. Also, a beam pair may require occasional calibration so that beams with acceptable performance are used for FD communication. However, if ongoing uplink data communications are scheduled for the UE during FD communications, the UE may be unable to perform sufficient self-interference measurements or beam pair calibration. For example, self-interference measurements and beam pair calibration may benefit from or require controlled conditions (e.g., transmit power, channel noise, transmission of particular reference signals, and so on), which may be difficult to achieve during ongoing data transmission. Thus, efficiency of beamformed communications may be reduced and occurrences of self-interference may increase.

Techniques and apparatuses described herein provide configuration and usage of an uplink gap at a UE for self-interference measurement and beam pair calibration. An uplink gap is a period of time in which uplink data communications are not scheduled for a UE. Thus, an uplink gap provides a time in which a UE can perform a self-interference measurement and/or a beam pair calibration without the added complication of uplink data communication. Some techniques and apparatuses described herein provide for a base station to transmit information or signaling in an uplink gap to assist with various operations of the UE, such as for beam pair calibration (e.g., automatic gain control (AGC) calibration, transmit power configuration, or downlink calibration). In this way, beam efficiency may be improved (by enabling the UE to perform improved beam pair calibration by using the uplink gap) and the occurrence of self-interference may be reduced (by enabling the UE to perform improved self-interference measurement by using the uplink gap).

Figure 4:
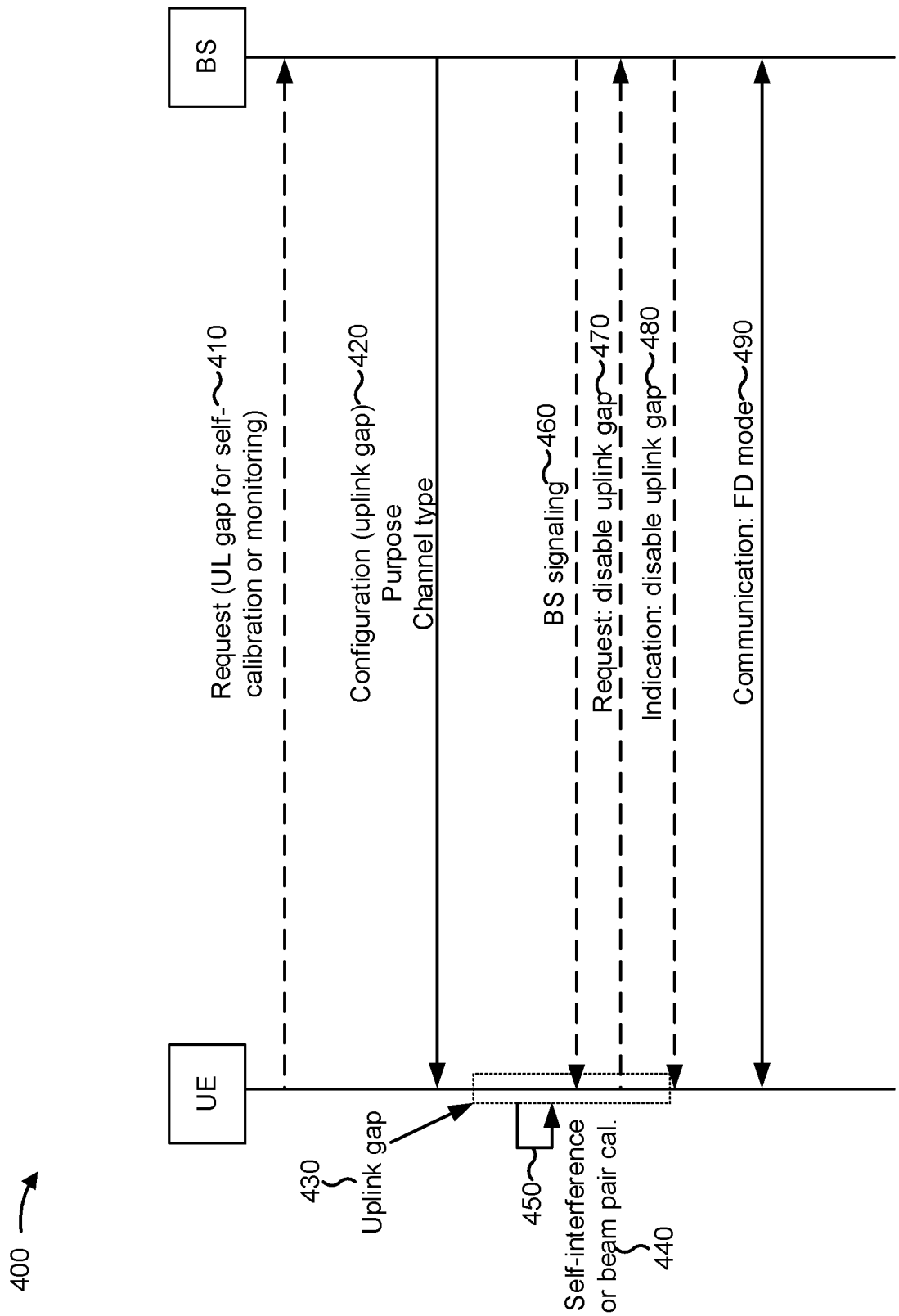
FIG. 4 is a diagram illustrating an example of signaling associated with configuration of an uplink gap for self-calibration or monitoring, in accordance with the present disclosure.

FIG. 4 is a diagram illustrating an example 400 of signaling associated with configuration of an uplink gap for self-calibration or monitoring, in accordance with the present disclosure. As shown, example 400 includes a UE (e.g., UE 120, UE 302) and a base station (e.g., base station 110). FIG. 4 shows an example of configuration and usage of an uplink gap for self-calibration or monitoring. For example, the self-calibration or monitoring may support full-duplex operation of the UE, as described in more detail below.

As shown in FIG. 4, and by reference number 410, in some aspects, the UE may transmit, and the BS may receive, a request associated with an uplink gap. For example, the UE may transmit the request via uplink control information, an uplink data transmission, a random access channel, an uplink reference signal, or the like. In some aspects, the UE may transmit the request based at least in part on a condition being satisfied at the UE. For example, the UE may transmit a request for an uplink gap based at least in part on a channel condition metric (or a change in a channel condition metric) satisfying a threshold. As another example, the UE may transmit a request for an uplink gap based at least in part on a metric associated with an environment of the UE (or a change in such a metric) satisfying a threshold. The channel condition metric or the metric associated with the environment may include, for example, an indication of channel quality, an indication of how busy a channel is, a number of UEs near the UE, or the like. In some aspects, the UE may transmit a request for an uplink gap based at least in part on a self-interference metric (or a change in a self-interference metric) satisfying a threshold. In some aspects, the UE may determine that one or more of the above metrics satisfies a threshold based at least in part on an ongoing uplink transmission of the UE.

In some aspects, the request may indicate a purpose for the uplink gap. For example, the request may indicate that the uplink gap is for self-interference measurement for full-duplex communication. As another example, the request may indicate that the uplink gap is for beam pair calibration at the UE to support FD communication. In some aspects, the request may indicate a requested type for the uplink gap, as described in more detail below. In some aspects, the request may indicate a requested channel type for the uplink gap, as is also described in more detail below.

In some aspects, the UE may request to modify an uplink gap. For example, the UE may request an updated periodicity of an uplink gap. In this case, the base station may configure the updated periodicity of the uplink gap based at least in part on the request.

As shown by reference number 420, the BS may transmit, and the UE may receive, configuration information including a configuration for an uplink gap. An example of an uplink gap is shown by reference number 430. In the uplink gap, the BS may not schedule uplink transmissions by the UE, and the UE may not perform uplink transmissions to the BS. The UE may, in some cases, perform transmissions relating to self-interference measurements and/or beam pair calibration. In some aspects, the uplink gap may be a single uplink gap. In some aspects, the uplink gap may occur periodically. For example, the uplink gap may be configured and de-configured via RRC signaling. In some aspects, the uplink gap may be semi-static. For example, the uplink gap may be configured via RRC signaling or MAC signaling, and may be activated or deactivated via MAC signaling or DCI.

In some aspects, the BS may transmit the configuration for the uplink gap based at least in part on receiving a request for an uplink gap from the UE. In some other aspects, the BS may transmit the configuration for the uplink gap without having received a request for an uplink gap from the UE. The BS may transmit the configuration for the uplink gap via system information, configuration information (e.g., radio resource control (RRC) signaling), medium access control (MAC) signaling, downlink control information (DCI), or a combination thereof.

In some aspects, the uplink gap may be associated with one or more parameters. For example, the one or more parameters may be signaled via the configuration. In some aspects, the uplink gap may be associated with a purpose. For example, the purpose may include self-interference measurement and/or beam pair calibration. In some aspects, information indicating the purpose may be signaled via the configuration. In some aspects, the uplink gap may be associated with a plurality of purposes. For example, the uplink gap may be associated with a first purpose including one or more of self-interference measurement or beam pair calibration, and a second purpose different than the first purpose. For example, the second purpose may include monitoring or self-calibration (e.g., power amplifier calibration, power consumption calibration, transceiver calibration due to temperature variation, UE transmit power calibration, or the like). In some aspects, each purpose of the uplink gap may be associated with one or more parameters. For example, each purpose can have a configured (e.g., different) transmit power, which may be indicated by the configuration (e.g., a maximum permissible exposure (MPE) measurement purpose or a self-calibration purpose may be associated with a lower transmit power than a self-interference measurement purpose). As another example, each purpose may have a configured (e.g., different) length of uplink gap. In some aspects, an uplink gap associated with multiple purposes may have a length based at least in part on a combination of lengths associated with the multiple purposes. For example, the uplink gap may have a length corresponding to a longest length associated with the multiple purposes, or may have a length corresponding to a sum of lengths associated with the multiple purposes.

In some aspects, an uplink gap may be associated with a type. For example, the configuration may indicate a type for an uplink gap. A type may indicate a particular self-interference measurement, beam pair calibration, or other action to be performed in an uplink gap. For example, a first type may indicate that the uplink gap is to be used for beam pair calibration based at least in part on measuring transmission configuration indicator (TCI) states for one or more active beam pairs for an FD mode. A TCI state indicates a QCL parameter and a source signal for a channel. The QCL parameter indicates one or more parameters (such as a spatial receive parameter or a spatial transmit parameter, a Doppler spread, a Doppler shift, or the like) to be derived from the source signal. As another example, a second type may indicate that the uplink gap is for the UE to perform beam pair calibration based at least in part on a beam search (e.g., a random search) to measure one or more new candidate beam pairs other than an active beam pair of the UE. In this case, the UE may transmit uplink reference signals on one or more uplink beams in order to identify suitable beam pairs that may include the one or more uplink beams. In some aspects, the base station may configure relatively fewer UEs to use overlapped uplink gaps of the second type than of the first type, which may mitigate cross-link interference due to the transmission of the uplink reference signals on the uplink beams.

In some aspects, the uplink gap may be associated with a channel type. A channel type may indicate a combination of an uplink channel and a downlink channel. The UE may perform a self-interference measurement or a beam pair calibration for the combination of the uplink channel and the downlink channel. The FD TCI states for different combinations of channels (e.g., associated with different channel types) may be different so that these combinations may be associated with different beam pairs for FD mode. Thus, by indicating one or more channel types for an uplink gap, the base station can indicate one or more beam pair calibrations or self-interference measurements to be performed. A channel type can include, for example, "control plus control" (where both of the uplink channel and the downlink channel are control channels), "reference signal plus reference signal" (where both of the uplink channel and the downlink channel are reference signals), "data plus data" (where both of the uplink channel and the downlink channel are data channels), or "mixed type" (where the downlink channel is one of a control channel, a data channel, or a reference signal, and the uplink channel is a different one of a control channel, a data channel, a reference signal).

In some aspects, uplink gap occasions may be configured for multiple UEs. For example, the configuration may be provided via a system parameter (e.g., system information, a cell-specific configuration, or a group-specific configuration). In this case, in some aspects, the BS may configure the uplink gap occasion based at least in part on a random seed. For example, the BS may randomize per-UE uplink gap occasion activation. The random seed may be specific to a UE and may indicate a start occasion indicating when to activate uplink gap occasions corresponding to a subset of uplink gaps. In this case, if an uplink gap occasion is configured periodically every 20 ms for a group of UEs, the base station may configure each UE of the group of UEs to randomly select a subset of uplink gap occasions of the configuration of the uplink gap occasions (e.g., based at least in part on a random seed, which may be based at least in part on, for example, a radio network temporary identifier (RNTI) of each UE). In some aspects, an uplink gap occasion is a time interval in which a UE can selectively use, or not use, an uplink gap. In some other aspects, an uplink gap occasion is a time interval in which a UE uses an uplink gap. In this way, cross-link interference can be mitigated across the group of UEs, since different UEs may select different uplink gap occasions.

In some aspects, the base station may configure a group of UEs based at least in part on cross-link interference reporting from the group of UEs. For example, the group of UEs may provide cross-link interference reporting to the base station. The base station may use the cross-link interference reporting to configure each UE to use a subset of uplink gap occasions. For example, the base station may configure each UE with an offset (e.g., a different offset, a unique offset) so that each UE uses a different set of uplink gap occasions, or so that different sub-groups of the group of UEs use different sets of uplink gap occasions. As another example, the base station may configure periodic uplink gap occasions 0 through 100. A first UE may start at occasion 0 and may use every fifth occasion (e.g., occasions 0, 5, 10, 15, 20 . . . ). A second UE may start at occasion 1 and use every fifth occasion (e.g., occasions 1, 6, 11, 16, 21 . . . ), and so on. The base station may configure the group of UEs in such a way that cross-link interference among the group of UEs is reduced or minimized. For example, the base station may configure the group of UEs to avoid multiple UEs (e.g., neighbor UEs) with cross-link interference that satisfies a threshold using a same uplink gap occasion. Thus, cross-link interference, in some implementations, is reduced.

In some aspects, the UE may be associated with a discontinuous reception (DRX) cycle. In a DRX sleep cycle, the UE may periodically enter a sleep state. The UE may periodically exit the sleep state to monitor for paging in a paging occasion. If the UE receives paging in a paging occasion, the UE may enter an active time for the length of an ON duration timer. After the ON duration timer expires, the UE may re-enter the sleep state until a next paging occasion. In some aspects, the base station may not be permitted to configure an uplink gap outside of an ON duration of a UE. In some other aspects, the base station may be permitted to configure an uplink gap outside of the ON duration of the UE, and the UE may be permitted to ignore the uplink gap outside of the ON duration. In some other aspects, the base station may be permitted to configure an uplink gap outside of an ON duration of the UE, and the UE may perform a self-interference measurement or a beam pair calibration in the uplink gap, as described in more detail below.

As shown by reference number 440, the UE may perform a self-interference measurement or a beam pair calibration in the uplink gap. For example, the UE may transmit an uplink reference signal in the uplink gap, as shown by reference number 450. In some aspects, the UE may transmit the uplink reference signal using an uplink beam of a beam pair for which the UE is performing self-interference measurement. In some aspects, the UE may transmit the uplink reference signal using an uplink beam, and may perform a self-interference measurement using a downlink beam of a beam pair to which the uplink beam belongs. For example, the UE may determine a measurement value regarding the uplink reference signal using the downlink beam (e.g., a reference signal received power (RSRP) value, signal to noise ratio (SNR), or a similar measurement value), where the measurement value identifies the self-interference measurement.

In some aspects, the UE may perform a beam pair calibration. "Beam pair calibration" may refer to an operation associated with identifying or refining a beam pair for full-duplex communication. As one example, "beam pair calibration" may include performing a cell search. As another example, "beam pair calibration" may include performing a beam pair search to identify one or more candidate beam pairs for full-duplex communication. As yet another example, "beam pair calibration" may include performing measurements on TCI states for one or more active beam pairs for an FD mode. As still another example, "beam pair calibration" may include performing beam refinement for one or more beams of a beam pair. As yet another example, "beam pair calibration" may include determining whether a measurement associated with a current beam pair of the UE satisfies a threshold (e.g., is satisfactory). Some forms of beam pair calibration are based at least in part on a self-interference measurement. For example, a UE may perform a self-interference measurement in an uplink gap, and may use the self-interference measurement to perform beam pair calibration (e.g., in the uplink gap or outside of the uplink gap).

In some aspects, the UE may perform a self-interference measurement in an uplink gap that is outside of a DRX ON duration. If the UE determines that a beam pair associated with the self-interference measurement has failed, the UE may transmit a random access channel (RACH) to report the beam pair's failure. By transmitting the RACH, the UE can report the failure of the beam pair despite no active uplink transmission occurring outside of the DRX ON duration.

As shown by reference number 460, in some aspects, the BS may transmit, and the UE may receive, signaling in the uplink gap. In some aspects, the BS may transmit a data transmission in the uplink gap. For example, the BS may transmit a data transmission (e.g., a small data transmission) in the uplink gap, and the UE may perform automatic gain control (AGC) calibration in the uplink gap. In some aspects, the BS may transmit information indicating a maximum power constraint for the UE (e.g., for the uplink gap). For example, the BS may define a maximum power constraint, such as for the self-interference measurement or the beam pair calibration of the UE (e.g., for transmission of the reference signal shown by reference number 450). In some aspects, the BS may transmit a reference signal in the uplink gap. For example, the BS may transmit a downlink reference signal for a downlink calibration such as a downlink quality calibration. In this case, the configuration shown by reference number 410 may indicate the downlink reference signal.

As shown by reference number 470, in some aspects, the UE may transmit, and the BS may receive, a request to disable an uplink gap. For example, the uplink gap may be a periodic uplink gap, such as based at least in part on a periodic configuration or a semi-persistent configuration. In this case, the UE may transmit a request to disable or deactivate the periodic uplink gap. In some aspects, the UE may transmit a request to skip one or more gaps. In some examples, the UE may determine that a beam pair (e.g., an active beam pair) satisfies a threshold (e.g., a threshold associated with stability, a threshold associated with quality). Based at least in part on this determination, the UE may transmit an indication to skip or disable the uplink gap. For example, the UE may transmit a request to skip or disable uplink gaps in the next X milliseconds, so that the base station can allocate the uplink gap's resources for other purposes and/or other UEs.

As shown by reference number 480, in some aspects, the BS may transmit an indication to disable an uplink gap. In some aspects, the indication may be transmitted via configuration information, and may de-configure the uplink gap. In some aspects, the indication may be transmitted via MAC signaling or DCI, and may deactivate a periodic or semi-persistent uplink gap. In some aspects, the BS may transmit the indication based at least in part on the request shown by reference number 470. In some other aspects, the BS may transmit the indication without having received the request shown by reference number 470.

As shown by reference number 490, in some aspects, the UE and/or the BS may perform a communication in an FD mode. For example, the UE and the BS may communicate using a beam pair determined and/or calibrated based at least in part on an uplink gap. As another example, the UE and the BS may communicate to determine a beam pair based at least in part on a self-interference measurement performed during an uplink gap.

As indicated above, FIG. 4 is provided as an example. Other examples may differ from what is described with regard to FIG. 4.

Figure 5:
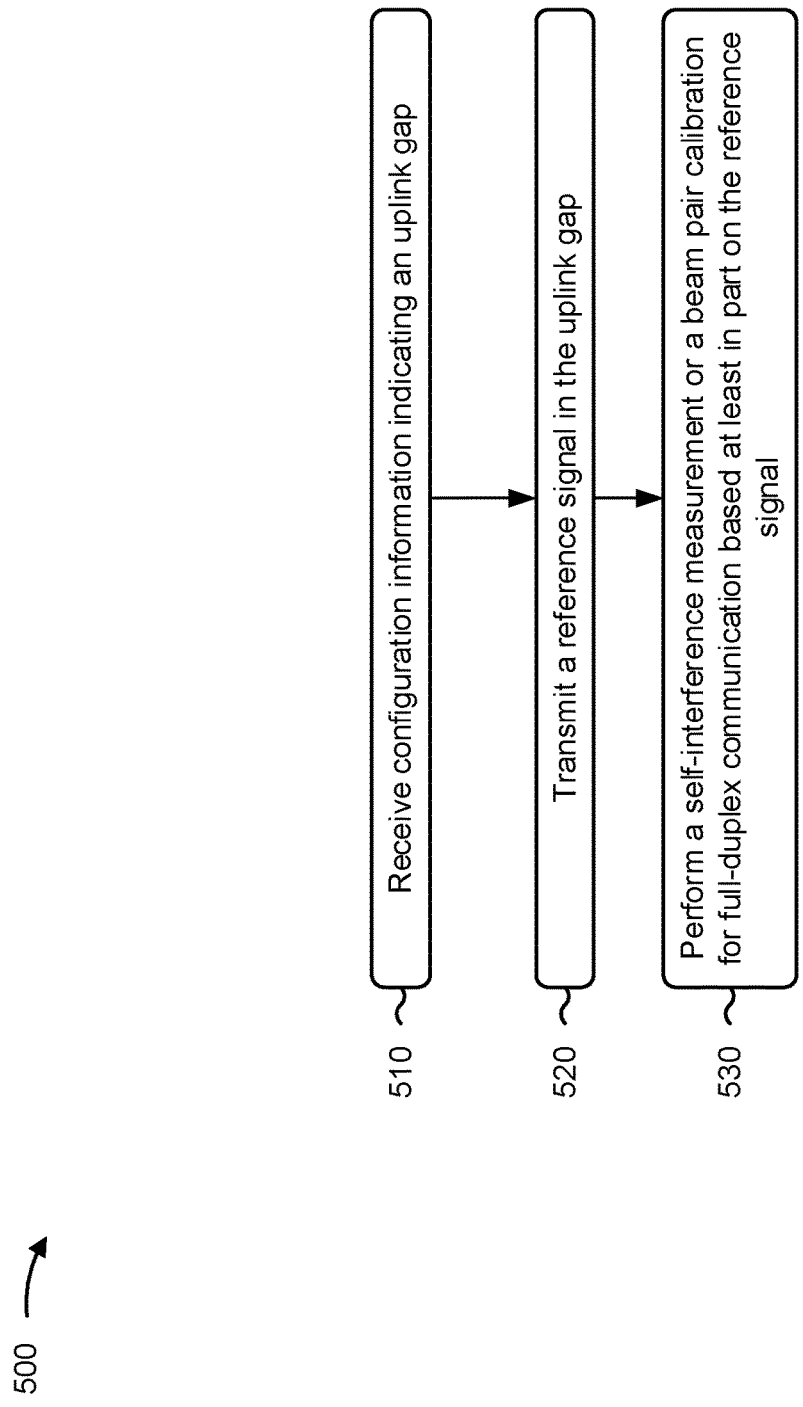
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120) performs operations associated with configuration of an uplink gap for self-interference measurement or beam pair calibration.

As shown in FIG. 5, in some aspects, process 500 may include receiving configuration information indicating an uplink gap (block 510). For example, the UE (e.g., using communication manager 140 and/or reception component 702, depicted in FIG. 7) may receive configuration information indicating an uplink gap, as described above.

As further shown in FIG. 5, in some aspects, process 500 may include transmitting a reference signal in the uplink gap (block 520). For example, the UE (e.g., using communication manager 140 and/or transmission component 704, depicted in FIG. 5) may transmit a reference signal in the uplink gap, as described above.

As further shown in FIG. 5, in some aspects, process 500 may include performing at least one of a self-interference measurement or a beam pair calibration for full-duplex communication based at least in part on the reference signal (block 530). For example, the UE (e.g., using communication manager 140 and/or measurement component 708, depicted in FIG. 7) may perform at least one of a self-interference measurement or a beam pair calibration for full-duplex communication based at least in part on the reference signal, as described above.

Process 500 may include additional aspects, such as any single aspect or any combination of aspects described below and/or in connection with one or more other processes described elsewhere herein.

In a first aspect, the self-interference measurement or the beam pair calibration is a first purpose for the uplink gap, and the configuration information indicates the first purpose and a second purpose for the uplink gap.

In a second aspect, alone or in combination with the first aspect, the second purpose includes at least one of a self-calibration purpose, or a monitoring purpose.

In a third aspect, alone or in combination with one or more of the first and second aspects, the configuration information indicates a first transmit power for the first purpose and a second transmit power for the second purpose.

In a fourth aspect, alone or in combination with one or more of the first through third aspects, a gap length of the uplink gap is based at least in part on at least one of: a longer gap length of a first gap length associated with the first purpose and a second gap length associated with the second purpose, or a combined gap length of the first gap length and the second gap length.

In a fifth aspect, alone or in combination with one or more of the first through fourth aspects, process 500 includes receiving, during the uplink gap, a data communication, and performing automatic gain control calibration based at least in part on the data communication.

In a sixth aspect, alone or in combination with one or more of the first through fifth aspects, the configuration information indicates a maximum power constraint for the uplink gap.

In a seventh aspect, alone or in combination with one or more of the first through sixth aspects, the configuration information indicates a downlink reference signal in the uplink gap, and process 500 includes performing a downlink calibration based at least in part on the downlink reference signal.

In an eighth aspect, alone or in combination with one or more of the first through seventh aspects, process 500 includes transmitting, prior to receiving the configuration information, a request for the uplink gap associated with self-interference measurement or the beam pair calibration for full-duplex communication.

In a ninth aspect, alone or in combination with one or more of the first through eighth aspects, process 500 includes transmitting a request for an updated periodicity for the uplink gap.

In a tenth aspect, alone or in combination with one or more of the first through ninth aspects, process 500 includes transmitting an indication to skip or disable one or more upcoming uplink gaps.

In an eleventh aspect, alone or in combination with one or more of the first through tenth aspects, the configuration information indicates a type associated with the uplink gap.

In a twelfth aspect, alone or in combination with one or more of the first through eleventh aspects, the type indicates that the self-interference measurement or the beam pair calibration is for one or more active downlink and uplink transmission configuration indicator states for one or more active beam pairs of the UE.

In a thirteenth aspect, alone or in combination with one or more of the first through twelfth aspects, the type indicates that the self-interference measurement or the beam pair calibration is for at least one new candidate beam pair search.

In a fourteenth aspect, alone or in combination with one or more of the first through thirteenth aspects, the type indicates a set of channel combinations for the self-interference measurement or the beam pair calibration.

In a fifteenth aspect, alone or in combination with one or more of the first through fourteenth aspects, the set of channel combinations includes a pair of control channels, a pair of reference signal channels, a pair of data channels, or a mixed pair of channels.

In a sixteenth aspect, alone or in combination with one or more of the first through fifteenth aspects, the configuration information applies to a group of UEs, wherein the configuration information configures a plurality of uplink gaps, and wherein the configuration information indicates a subset of uplink gaps, of the plurality of uplink gaps, for the UE.

In a seventeenth aspect, alone or in combination with one or more of the first through sixteenth aspects, the subset of uplink gaps are indicated based at least in part on a random seed specific to the UE.

In an eighteenth aspect, alone or in combination with one or more of the first through seventeenth aspects, the subset of uplink gaps are explicitly indicated by the configuration information based at least in part on a cross-link interference report from the UE.

In a nineteenth aspect, alone or in combination with one or more of the first through eighteenth aspects, the uplink gap is configured within a discontinuous reception ON duration based at least in part on a rule indicating that uplink gaps shall not be configured outside of discontinuous reception ON durations or that the UE can ignore uplink gaps configured outside of discontinuous reception ON durations.

In a twentieth aspect, alone or in combination with one or more of the first through nineteenth aspects, the uplink gap is outside of a discontinuous reception ON duration of the UE.

In a twenty-first aspect, alone or in combination with one or more of the first through twentieth aspects, process 500 includes identifying a failed beam based at least in part on the beam pair calibration, and transmitting a random access channel based at least in part on the failed beam.

In a twenty-second aspect, alone or in combination with one or more of the first through twenty-first aspects, the configuration information indicates that the uplink gap is associated with the self-interference measurement or associated with a beam pair calibration for full-duplex communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
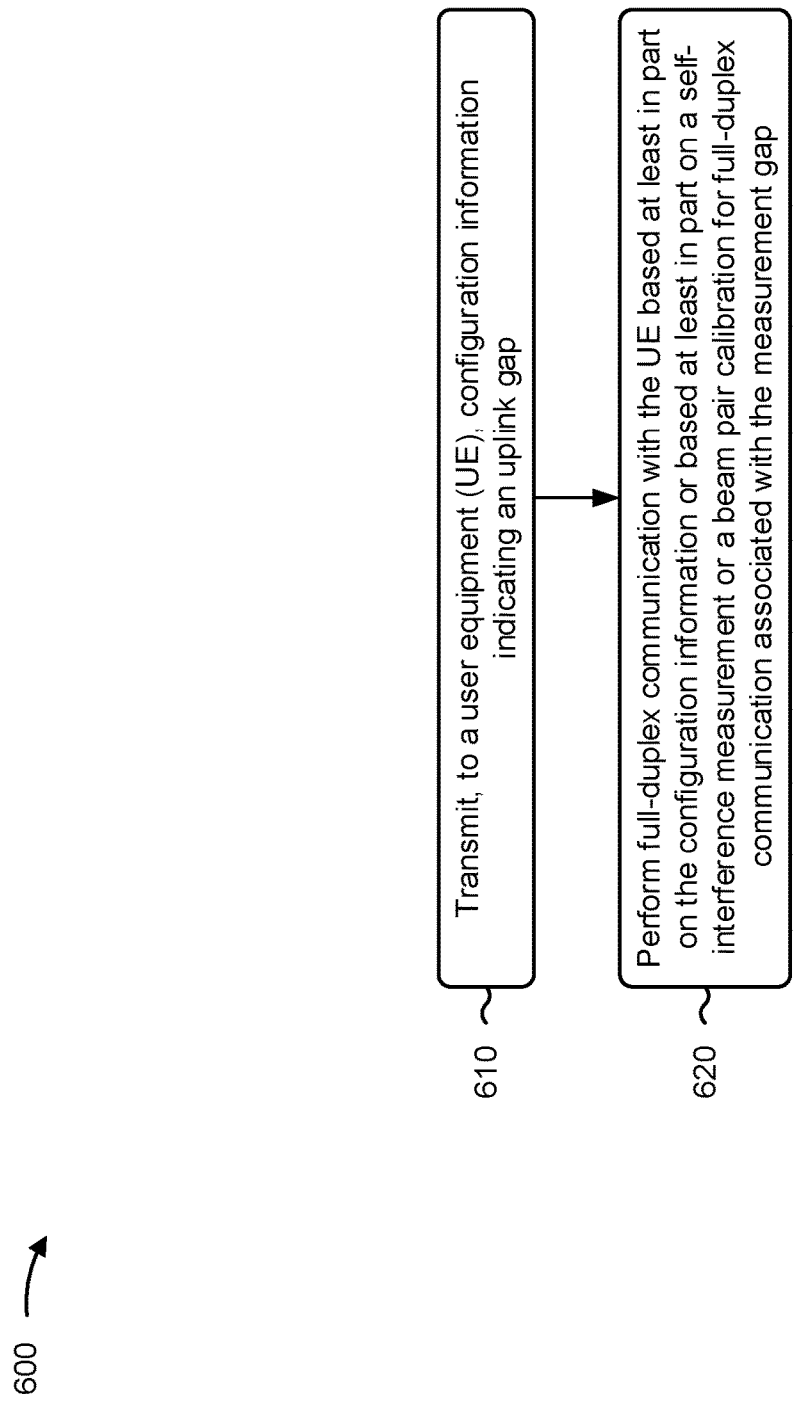
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110) performs operations associated with configuration of an uplink gap for self-interference measurement or beam pair calibration.

As shown in FIG. 6, in some aspects, process 600 may include transmitting, to a UE, configuration information indicating an uplink gap (block 610). For example, the base station (e.g., using communication manager 150 and/or configuration component 808, depicted in FIG. 8) may transmit, to a UE, configuration information indicating an uplink gap, as described above.

As further shown in FIG. 6, in some aspects, process 600 may include performing full-duplex communication with the UE based at least in part on the configuration information or based at least in part on a self-interference measurement or a beam pair calibration for full-duplex communication associated with the uplink gap (block 620). For example, the base station (e.g., using communication manager 150, reception component 802, and/or transmission component 804, depicted in FIG. 8) may perform full-duplex communication with the UE based at least in part on the configuration information, as described above. In some aspects, the base station may communicate with the UE based at least in part on a self-interference measurement performed by the UE in the uplink gap or a beam pair calibration for full-duplex communication performed by the UE based at least in part on the self-interference measurement and/or in the uplink gap. Thus, the self-interference measurement and the beam pair calibration may be said to be associated with the uplink gap.

Process 600 may include additional aspects, such as any single aspect or any combination of aspects described below and/or in connection with one or more other processes described elsewhere herein.

In a first aspect, the self-interference measurement or the beam pair calibration is a first purpose for the uplink gap, and the configuration information indicates the first purpose and a second purpose for the uplink gap.

In a second aspect, alone or in combination with the first aspect, the second purpose includes at least one of a self-calibration purpose, or a monitoring purpose.

In a third aspect, alone or in combination with one or more of the first and second aspects, the configuration information indicates a first transmit power for the first purpose and a second transmit power for the second purpose.

In a fourth aspect, alone or in combination with one or more of the first through third aspects, a gap length of the uplink gap is based at least in part on at least one of: a longer gap length of a first gap length associated with the first purpose and a second gap length associated with the second purpose, or a combined gap length of the first gap length and the second gap length.

In a fifth aspect, alone or in combination with one or more of the first through fourth aspects, process 600 includes transmitting, during the uplink gap, a data communication for automatic gain control calibration.

In a sixth aspect, alone or in combination with one or more of the first through fifth aspects, the configuration information indicates a maximum power constraint for the uplink gap.

In a seventh aspect, alone or in combination with one or more of the first through sixth aspects, the configuration information indicates a downlink reference signal in the uplink gap for a downlink calibration.

In an eighth aspect, alone or in combination with one or more of the first through seventh aspects, process 600 includes receiving, prior to transmitting the configuration information, a request for the uplink gap associated with self-interference measurement or the beam pair calibration for full-duplex communication.

In a ninth aspect, alone or in combination with one or more of the first through eighth aspects, process 600 includes receiving a request for an updated periodicity for the uplink gap, and configuring the updated periodicity for the uplink gap.

In a tenth aspect, alone or in combination with one or more of the first through ninth aspects, process 600 includes receiving an indication to skip or disable one or more upcoming uplink gaps, and skipping or disabling the one or more upcoming uplink gaps for the UE.

In an eleventh aspect, alone or in combination with one or more of the first through tenth aspects, the configuration information indicates a type associated with the uplink gap.

In a twelfth aspect, alone or in combination with one or more of the first through eleventh aspects, the type indicates that the self-interference measurement or the beam pair calibration is for one or more active downlink and uplink transmission configuration indicator states for one or more active beam pairs of the UE.

In a thirteenth aspect, alone or in combination with one or more of the first through twelfth aspects, the type indicates that the self-interference measurement or the beam pair calibration is for at least one new candidate beam pair search.

In a fourteenth aspect, alone or in combination with one or more of the first through thirteenth aspects, the type indicates a set of channel combinations for the self-interference measurement or the beam pair calibration.

In a fifteenth aspect, alone or in combination with one or more of the first through fourteenth aspects, the set of channel combinations includes a pair of control channels, a pair of reference signal channels, a pair of data channels, or a mixed pair of channels.

In a sixteenth aspect, alone or in combination with one or more of the first through fifteenth aspects, the configuration information applies to a group of UEs, wherein the configuration information configures a plurality of uplink gaps, and wherein the configuration information indicates a subset of uplink gaps, of the plurality of uplink gaps, for the UE.

In a seventeenth aspect, alone or in combination with one or more of the first through sixteenth aspects, the subset of uplink gaps are indicated based at least in part on a random seed, wherein different UEs are assigned different random seeds.

In an eighteenth aspect, alone or in combination with one or more of the first through seventeenth aspects, the subset of uplink gaps are explicitly indicated by the configuration information, and where the subset of uplink gaps are selected based at least in part on cross-link interference reports from a plurality of UEs.

In a nineteenth aspect, alone or in combination with one or more of the first through eighteenth aspects, the uplink gap is configured within a discontinuous reception ON duration based at least in part on a rule indicating that uplink gaps shall not be configured outside of discontinuous reception ON durations or that the UE can ignore uplink gaps configured outside of discontinuous reception ON durations.

In a twentieth aspect, alone or in combination with one or more of the first through nineteenth aspects, the uplink gap is outside of a discontinuous reception ON duration of the UE.

In a twenty-first aspect, alone or in combination with one or more of the first through twentieth aspects, process 600 includes receiving a random access channel indicating a failed beam based at least in part on the beam pair calibration.

In a twenty-second aspect, alone or in combination with one or more of the first through twenty-first aspects, the configuration information indicates that the uplink gap is associated with the self-interference measurement or associated with a beam pair calibration for full-duplex communication.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
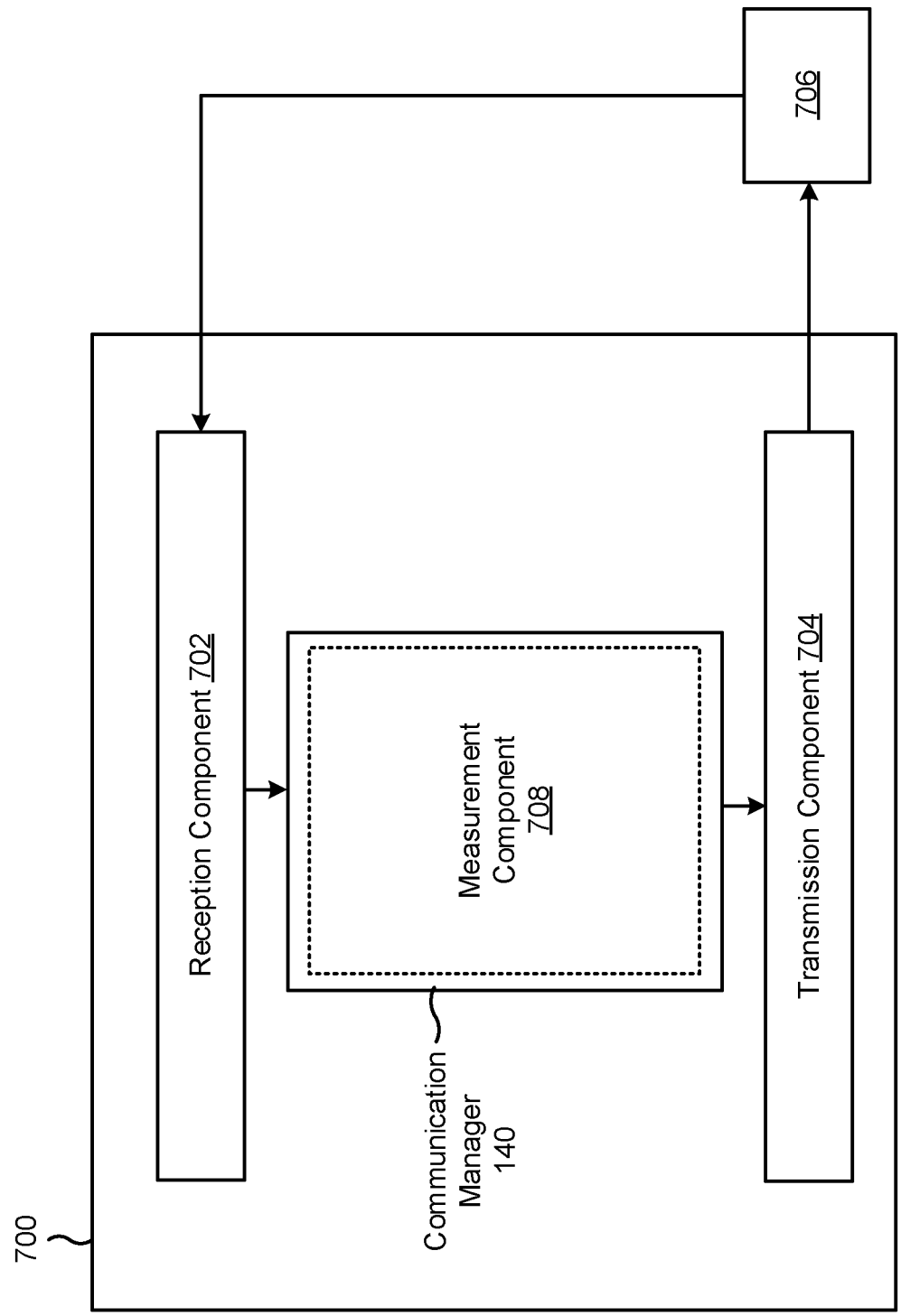
FIG. 7 is a diagram of an example apparatus for wireless communication, in accordance with the present disclosure.

FIG. 7 is a diagram of an example apparatus 700 for wireless communication, in accordance with the present disclosure. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include the communication manager 140. The communication manager 140 may include a measurement component 708, among other examples.

In some aspects, the apparatus 700 may be configured to perform one or more operations described herein in connection with FIGS. 3-4. Additionally, or alternatively, the apparatus 700 may be configured to perform one or more processes described herein, such as process 500 of FIG. 5, or a combination thereof. In some aspects, the apparatus 700 and/or one or more components shown in FIG. 7 may include one or more components of the UE described in connection with FIG. 2. Additionally, or alternatively, one or more components shown in FIG. 7 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 700. In some aspects, the reception component 702 may include one or more antennas, a modem, a demodulator, a MIMO detector, a receive processor, a controller/processor, a memory, or a combination thereof, of the UE described in connection with FIG. 2.

The transmission component 704 may transmit communications, such as reference signals, control information, data communications, or a combination thereof, to the apparatus 706. In some aspects, one or more other components of the apparatus 700 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modem, a modulator, a transmit MIMO processor, a transmit processor, a controller/processor, a memory, or a combination thereof, of the UE described in connection with FIG. 2. In some aspects, the transmission component 704 may be co-located with the reception component 702 in a transceiver.

The reception component 702 may receive configuration information indicating an uplink gap. The transmission component 704 may transmit a reference signal in the uplink gap. The measurement component 708 may perform a self-interference measurement or a beam pair calibration for full-duplex communication based at least in part on the reference signal.

The reception component 702 may receive, during the uplink gap, a data communication.

The measurement component 708 may perform automatic gain control calibration based at least in part on the data communication.

The transmission component 704 may transmit, prior to receiving the configuration information, a request for the uplink gap associated with self-interference measurement or the beam pair calibration for full-duplex communication.

The transmission component 704 may transmit a request for an updated periodicity for the uplink gap.

The transmission component 704 may transmit an indication to skip or disable one or more upcoming uplink gaps.

The measurement component 708 may identify a failed beam based at least in part on the beam pair calibration.

The transmission component 704 may transmit a random access channel based at least in part on the failed beam.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
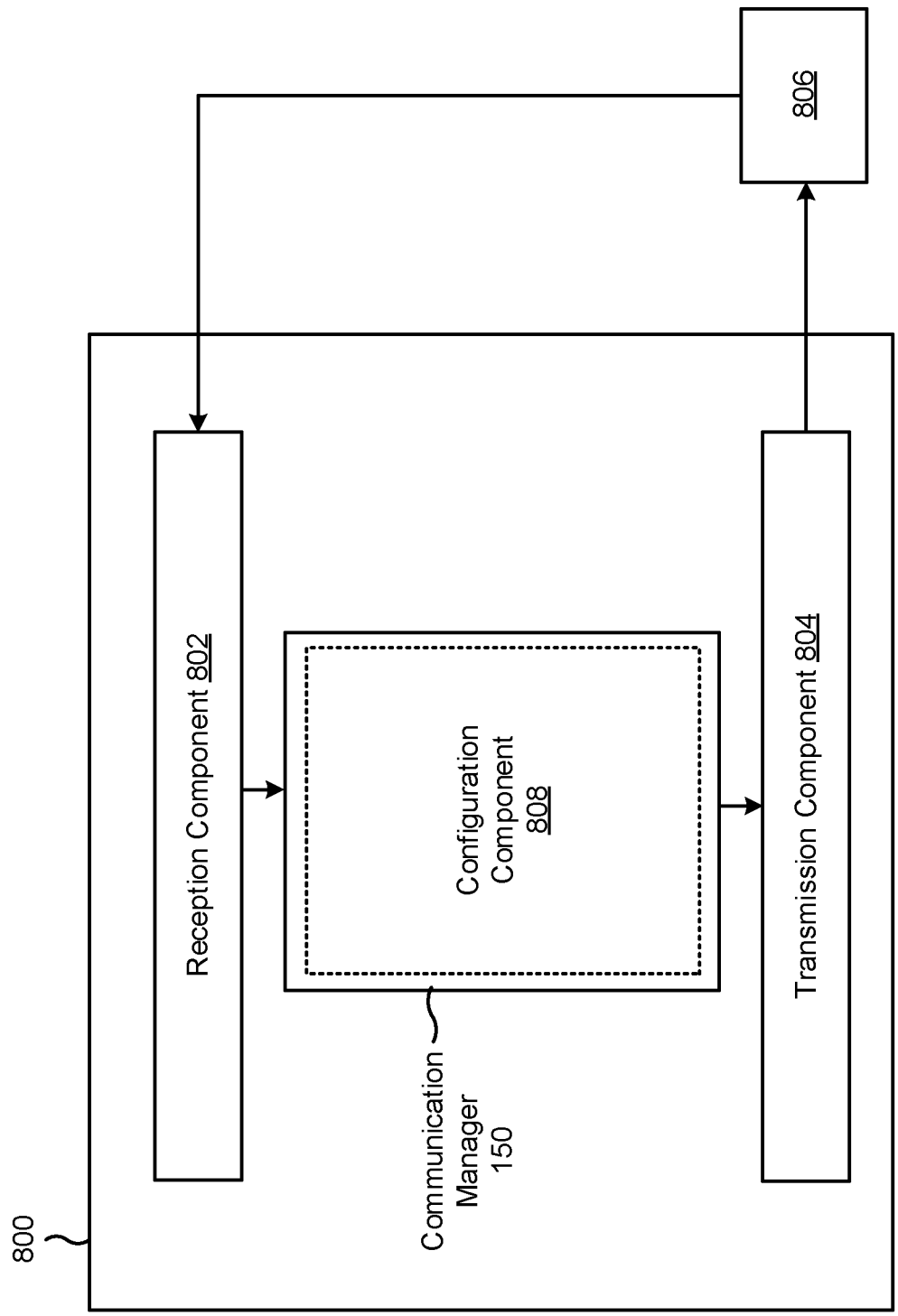
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 150. The communication manager 150 may include a configuration component 808, among other examples.

In some aspects, the apparatus 800 may be configured to perform one or more operations described herein in connection with FIGS. 3-4. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the base station described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the base station described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the base station described in connection with FIG. 2. In some aspects, the transmission component 804 may be co-located with the reception component 802 in a transceiver.

The configuration component 808 may transmit, to a UE, configuration information indicating an uplink gap. The transmission component 804 or the reception component 802 may perform full-duplex communication with the UE based at least in part on the configuration information.

The transmission component 804 may transmit, during the uplink gap, a data communication for automatic gain control calibration.

The reception component 802 may receive, prior to transmitting the configuration information, a request for the uplink gap associated with self-interference measurement or the beam pair calibration for full-duplex communication.

The reception component 802 may receive a request for an updated periodicity for the uplink gap.

The configuration component 808 may configure the updated periodicity for the uplink gap.

The reception component 802 may receive an indication to skip or disable one or more upcoming uplink gaps.

The configuration component 808 may skip or disable the one or more upcoming uplink gaps for the UE.

The reception component 802 may receive a random access channel indicating a failed beam based at least in part on the beam pair calibration.

The number and arrangement of components shown in FIG. 8 are provided as an example. In practice, there may be additional components, fewer components, different components, or differently arranged components than those shown in FIG. 8.

Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a user equipment (UE), comprising: receiving configuration information indicating an uplink gap; transmitting a reference signal in the uplink gap; and performing a self-interference measurement or a beam pair calibration for full-duplex communication based at least in part on the reference signal.

Aspect 2: The method of Aspect 1, wherein the self-interference measurement or the beam pair calibration is a first purpose for the uplink gap, and wherein the configuration information indicates the first purpose and a second purpose for the uplink gap.

Aspect 3: The method of Aspect 2, wherein the second purpose includes at least one of: a self-calibration purpose, or a monitoring purpose.

Aspect 4: The method of Aspect 2, wherein the configuration information indicates a first transmit power for the first purpose and a second transmit power for the second purpose.

Aspect 5: The method of Aspect 2, wherein a gap length of the uplink gap is based at least in part on at least one of a longer gap length of a first gap length associated with the first purpose and a second gap length associated with the second purpose, or a combined gap length of the first gap length and the second gap length.

Aspect 6: The method of any of Aspects 1-5, further comprising: receiving, during the uplink gap, a data communication; and performing automatic gain control calibration based at least in part on the data communication.

Aspect 7: The method of any of Aspects 1-6, wherein the configuration information indicates a maximum power constraint for the uplink gap.

Aspect 8: The method of any of Aspects 1-7, wherein the configuration information indicates a downlink reference signal in the uplink gap, and wherein the method further comprises: performing a downlink calibration based at least in part on the downlink reference signal.

Aspect 9: The method of any of Aspects 1-8, further comprising: transmitting, prior to receiving the configuration information, a request for the uplink gap associated with self-interference measurement or the beam pair calibration for full-duplex communication.

Aspect 10: The method of any of Aspects 1-9, further comprising: transmitting a request for an updated periodicity for the uplink gap.

Aspect 11: The method of any of Aspects 1-10, further comprising:
transmitting an indication to skip or disable one or more upcoming uplink gaps.

Aspect 12: The method of any of Aspects 1-11, wherein the configuration information indicates a type associated with the uplink gap.

Aspect 13: The method of Aspect 12, wherein the type indicates that the self-interference measurement or the beam pair calibration is for one or more active downlink and uplink transmission configuration indicator states for one or more active beam pairs of the UE.

Aspect 14: The method of Aspect 12, wherein the type indicates that the self-interference measurement or the beam pair calibration is for at least one new candidate beam pair search.

Aspect 15: The method of Aspect 12, wherein the type indicates a set of channel combinations for the self-interference measurement or the beam pair calibration.

Aspect 16: The method of Aspect 15, wherein the set of channel combinations includes: a pair of control channels, a pair of reference signal channels, a pair of data channels, or a mixed pair of channels.

Aspect 17: The method of any of Aspects 1-16, wherein the configuration information applies to a group of UEs, wherein the configuration information configures a plurality of uplink gap occasions, and wherein the configuration information indicates a subset of uplink gap occasions, of the plurality of uplink gap occasions, for the UE.

Aspect 18: The method of Aspect 17, wherein start occasions for the subset of uplink gap occasions are indicated based at least in part on a random seed specific to the UE that indicates when to activate uplink gap occasions corresponding to the subset of uplink gaps.

Aspect 19: The method of Aspect 17, wherein the subset of uplink gap occasions are explicitly indicated by the configuration information based at least in part on a cross-link interference report from the UE.

Aspect 20: The method of any of Aspects 1-19, wherein the uplink gap is configured within a discontinuous reception ON duration based at least in part on a rule indicating that uplink gaps shall not be configured outside of discontinuous reception ON durations or that the UE can ignore uplink gaps configured outside of discontinuous reception ON durations.

Aspect 21: The method of any of Aspects 1-20, wherein the uplink gap is outside of a discontinuous reception ON duration of the UE.

Aspect 22: The method of Aspect 21, further comprising: identifying a failed beam based at least in part on the beam pair calibration; and transmitting a random access channel based at least in part on the failed beam.

Aspect 23: A method of wireless communication performed by a base station, comprising: transmitting, to a user equipment (UE), configuration information indicating an uplink gap; and performing full-duplex communication with the UE based at least in part on the configuration information or based at least in part on a self-interference measurement or a beam pair calibration for full-duplex communication associated with the uplink gap.

Aspect 24: The method of Aspect 23, wherein the self-interference measurement or the beam pair calibration is a first purpose for the uplink gap, and wherein the configuration information indicates the first purpose and a second purpose for the uplink gap.

Aspect 25: The method of Aspect 24, wherein the second purpose includes at least one of: a self-calibration purpose, or a monitoring purpose.

Aspect 26: The method of Aspect 24, wherein the configuration information indicates a first transmit power for the first purpose and a second transmit power for the second purpose.

Aspect 27: The method of Aspect 24, wherein a gap length of the uplink gap is based at least in part on at least one of a longer gap length of a first gap length associated with the first purpose and a second gap length associated with the second purpose, or a combined gap length of the first gap length and the second gap length.

Aspect 28: The method of any of Aspects 23-27, further comprising: transmitting, during the uplink gap, a data communication for automatic gain control calibration.

Aspect 29: The method of any of Aspects 23-28, wherein the configuration information indicates a maximum power constraint for the uplink gap.

Aspect 30: The method of any of Aspects 23-29, wherein the configuration information indicates a downlink reference signal in the uplink gap for a downlink calibration.

Aspect 31: The method of any of Aspects 23-30, further comprising: receiving, prior to transmitting the configuration information, a request for the uplink gap associated with self-interference measurement or the beam pair calibration for full-duplex communication.

Aspect 32: The method of any of Aspects 23-31, further comprising: receiving a request for an updated periodicity for the uplink gap; and configuring the updated periodicity for the uplink gap.

Aspect 33: The method of any of Aspects 23-32, further comprising: receiving an indication to skip or disable one or more upcoming uplink gaps; and skipping or disabling the one or more upcoming uplink gaps for the UE.

Aspect 34: The method of any of Aspects 23-33, wherein the configuration information indicates a type associated with the uplink gap.

Aspect 35: The method of Aspect 34, wherein the type indicates that the self-interference measurement or the beam pair calibration is for one or more active downlink and uplink transmission configuration indicator states for one or more active beam pairs of the UE.

Aspect 36: The method of Aspect 34, wherein the type indicates that the self-interference measurement or the beam pair calibration is for at least one new candidate beam pair search.

Aspect 37: The method of Aspect 34, wherein the type indicates a set of channel combinations for the self-interference measurement or the beam pair calibration.

Aspect 38: The method of Aspect 37, wherein the set of channel combinations includes: a pair of control channels, a pair of reference signal channels, a pair of data channels, or a mixed pair of channels.

Aspect 39: The method of any of Aspects 23-38, wherein the configuration information applies to a group of UEs, wherein the configuration information configures a plurality of uplink gap occasions, and wherein the configuration information indicates a subset of uplink gap occasions, of the plurality of uplink gap occasions, for the UE.

Aspect 40: The method of Aspect 39, wherein start occasions for the subset of uplink gap occasions are indicated based at least in part on a random seed, wherein different UEs are assigned different random seeds.

Aspect 41: The method of Aspect 39, wherein the subset of uplink gap occasions are explicitly indicated by the configuration information, and where the subset of uplink gap occasions are selected based at least in part on cross-link interference reports from a plurality of UEs to avoid multiple UEs with cross-link interference that satisfies a threshold using a same uplink gap occasion.

Aspect 42: The method of any of Aspects 23-41, wherein the uplink gap is configured within a discontinuous reception ON duration based at least in part on a rule indicating that uplink gaps shall not be configured outside of discontinuous reception ON durations or that the UE can ignore uplink gaps configured outside of discontinuous reception ON durations.

Aspect 43: The method of any of Aspects 23-42, wherein the uplink gap is outside of a discontinuous reception ON duration of the UE.

Aspect 44: The method of Aspect 43, further comprising: receiving a random access channel indicating a failed beam based at least in part on the beam pair calibration.

Aspect 45: An apparatus for wireless communication at a device, comprising a processor; memory coupled with the processor; and instructions stored in the memory and executable by the processor to cause the apparatus to perform the method of one or more of Aspects 1-44.

Aspect 46: A device for wireless communication, comprising a memory and one or more processors coupled to the memory, the one or more processors configured to perform the method of one or more of Aspects 1-44.

Aspect 47: An apparatus for wireless communication, comprising at least one means for performing the method of one or more of Aspects 1-44.

Aspect 48: A non-transitory computer-readable medium storing code for wireless communication, the code comprising instructions executable by a processor to perform the method of one or more of Aspects 1-44.

Aspect 49: A non-transitory computer-readable medium storing a set of instructions for wireless communication, the set of instructions comprising one or more instructions that, when executed by one or more processors of a device, cause the device to perform the method of one or more of Aspects 1-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive configuration information indicating an uplink gap;
transmit a reference signal in the uplink gap;
receive, from a base station, signaling in the uplink gap; and
perform, based at least in part on the reference signal and the signaling in the uplink gap, at least one of a self-interference measurement or a beam pair calibration for full-duplex communication,
wherein the self-interference measurement or the beam pair calibration is a first purpose for the uplink gap, and wherein the configuration information indicates the first purpose and a second purpose for the uplink gap.

2. The UE of claim 1, wherein the second purpose includes at least one of:
a self-calibration purpose, a monitoring purpose, a power efficiency and power consumption purpose, a transceiver calibration purpose, or a transmit power management purpose.

3. The UE of claim 1, wherein the configuration information indicates a first transmit power for the first purpose and a second transmit power for the second purpose.

4. The UE of claim 1, wherein a gap length of the uplink gap is based at least in part on at least one of:
a longer gap length of a first gap length associated with the first purpose and a second gap length associated with the second purpose, or
a combined gap length of the first gap length and the second gap length.

5. The UE of claim 1, wherein the one or more processors are further configured to:
receive, during the uplink gap, a data communication; and
perform automatic gain control calibration based at least in part on the data communication.

6. The UE of claim 1, wherein the configuration information indicates a maximum power constraint for the uplink gap.

7. The UE of claim 1, wherein the configuration information indicates a downlink reference signal in the uplink gap,
wherein the signaling in the uplink gap comprises the downlink reference signal, and
wherein the one or more processors are configured to:
perform a downlink calibration based at least in part on the downlink reference signal.

8. The UE of claim 1, wherein the one or more processors are further configured to:
transmit, prior to receiving the configuration information, a request for the uplink gap associated with self-interference measurement or the beam pair calibration for full-duplex communication.

9. The UE of claim 1, wherein the one or more processors are further configured to:
transmit a request for an updated periodicity for the uplink gap.

10. The UE of claim 1, wherein the one or more processors are further configured to:
transmit an indication to skip or disable one or more upcoming uplink gaps.

11. The UE of claim 1, wherein the configuration information applies to a group of UEs, wherein the configuration information configures a plurality of uplink gap occasions, and wherein the configuration information indicates a subset of uplink gap occasions, of the plurality of uplink gap occasions, for the UE.

12. The UE of claim 1, wherein the uplink gap is configured within a discontinuous reception ON duration based at least in part on a rule indicating that uplink gaps shall not be configured outside of discontinuous reception ON durations or that the UE can ignore uplink gaps configured outside of discontinuous reception ON durations.

13. The UE of claim 1, wherein the uplink gap is outside of a discontinuous reception ON duration of the UE.

14. The UE of claim 1, wherein the configuration information indicates that the uplink gap is associated with the self-interference measurement or associated with the beam pair calibration for full-duplex communication.

15. A base station for wireless communication, comprising:
   a memory; and
   one or more processors, coupled to the memory, configured to:
      transmit, to a user equipment (UE), configuration information indicating an uplink gap;
      transmit, to the UE, signaling in the uplink gap; and
      perform full-duplex communication with the UE based at least in part on:
         the signaling in the uplink gap, and
         the configuration information or a self-interference measurement or a beam pair calibration for full-duplex communication associated with the uplink gap,
            wherein the self-interference measurement or the beam pair calibration is a first purpose for the uplink gap, and wherein the configuration information indicates the first purpose and a second purpose for the uplink gap.

16. The base station of claim 15, wherein the one or more processors are further configured to:
   transmit, during the uplink gap, a data communication for automatic gain control calibration.

17. The base station of claim 15, wherein the configuration information indicates a maximum power constraint for the uplink gap.

18. The base station of claim 15, wherein the configuration information indicates a downlink reference signal in the uplink gap for a downlink calibration, and wherein the signaling in the uplink gap comprises the downlink reference signal.

19. The base station of claim 15, wherein the one or more processors are further configured to:
   receive, prior to transmitting the configuration information, a request for the uplink gap associated with self-interference measurement or the beam pair calibration for full-duplex communication.

20. The base station of claim 15, wherein the one or more processors are further configured to:
   receive a request for an updated periodicity for the uplink gap; and
   configure the updated periodicity for the uplink gap.

21. The base station of claim 15, wherein the one or more processors are further configured to:
   receive an indication to skip or disable one or more upcoming uplink gaps; and
   skip or disabling the one or more upcoming uplink gaps for the UE.

22. The base station of claim 15, wherein the configuration information applies to a group of UEs, wherein the configuration information configures a plurality of uplink gap occasions, and wherein the configuration information indicates a subset of uplink gap occasions, of the plurality of uplink gap occasions, for the UE.

23. The base station of claim 15, wherein the uplink gap is configured within a discontinuous reception ON duration based at least in part on a rule indicating that uplink gaps shall not be configured outside of discontinuous reception ON durations or that the UE can ignore uplink gaps configured outside of discontinuous reception ON durations.

24. The base station of claim 15, wherein the configuration information indicates that the uplink gap is associated with at least one of the self-interference measurement or the beam pair calibration.

25. A method of wireless communication performed by a user equipment (UE), comprising:
   receiving configuration information indicating an uplink gap;
   transmitting a reference signal in the uplink gap;
   receiving, from a base station, signaling in the uplink gap; and
   performing, based at least in part on the reference signal and the signaling in the uplink gap, a self-interference measurement or a beam pair calibration for full-duplex communication,
      wherein the self-interference measurement or the beam pair calibration is a first purpose for the uplink gap, and wherein the configuration information indicates the first purpose and a second purpose for the uplink gap.

26. A method of wireless communication performed by a base station, comprising:
   transmitting, to a user equipment (UE), configuration information indicating an uplink gap;
   transmitting, to the UE, signaling in the uplink gap; and
   performing full-duplex communication with the UE based at least in part on:
      the signaling in the uplink gap, and
      the configuration information or a self-interference measurement or a beam pair calibration for full-duplex communication performed in the uplink gap,
   wherein the self-interference measurement or the beam pair calibration is a first purpose for the uplink gap, and wherein the configuration information indicates the first purpose and a second purpose for the uplink gap.

* * * * *